(12) United States Patent
Myers

(10) Patent No.: US 12,479,346 B2
(45) Date of Patent: Nov. 25, 2025

(54) GRAB BAR MOUNT

(71) Applicant: Gary Andrew Myers, Chandler, AZ (US)

(72) Inventor: Gary Andrew Myers, Chandler, AZ (US)

( * ) Notice: Subject to any disclaimer, the term of this patent is extended or adjusted under 35 U.S.C. 154(b) by 0 days.

(21) Appl. No.: 18/672,705

(22) Filed: May 23, 2024

(65) Prior Publication Data
US 2024/0308406 A1 Sep. 19, 2024

Related U.S. Application Data

(63) Continuation of application No. 17/559,047, filed on Dec. 22, 2021, now Pat. No. 11,993,189.

(51) Int. Cl.
*B60N 3/02* (2006.01)
*B60R 11/00* (2006.01)

(52) U.S. Cl.
CPC .............. *B60N 3/026* (2013.01); *B60R 11/00* (2013.01); *B60R 2011/0059* (2013.01)

(58) Field of Classification Search
CPC .. B60N 3/026; B60R 11/00; B60R 2011/0059
See application file for complete search history.

(56) References Cited

U.S. PATENT DOCUMENTS

| | | | |
|---|---|---|---|
| 4,195,806 A | 4/1980 | Berry | |
| 5,320,444 A * | 6/1994 | Bookwalter | F16B 2/12 606/151 |
| 6,622,980 B2 | 9/2003 | Boucher et al. | |
| 7,232,099 B1 | 6/2007 | Wilcox | |
| 7,686,267 B2 * | 3/2010 | DaSilva | A61B 17/02 5/607 |
| 8,051,515 B1 | 11/2011 | Kring | |
| 8,403,280 B2 | 3/2013 | Halverson et al. | |
| 9,022,334 B1 | 5/2015 | DeMayo | |
| 10,072,794 B2 | 9/2018 | Koch | |
| 10,189,525 B2 | 1/2019 | Allen | |

* cited by examiner

*Primary Examiner* — Anita M King
(74) *Attorney, Agent, or Firm* — Schmeiser, Olsen & Watts LLP; Sean K. Enos

(57) ABSTRACT

A grab bar mount is provided. The grab bar mount includes an upper member having a first channeled recess and a lower member having a second channeled recess. The first channeled recess has a size and shape corresponding to a size and shape of an upper portion of a grab bar post of an off road vehicle. The second channeled recess has a size and shape corresponding to a size and shape of a lower portion of the grab bar post of the off road vehicle. The upper member and the lower member are releasably coupled together around the grab bar post with the grab bar post extending through the first and second channeled recesses. The grab bar mount geometry of the channeled recesses operate to engage the outer surfaces of the grab bar post and inhibits movement of the grab bar mount with respect to the grab bar post.

5 Claims, 11 Drawing Sheets

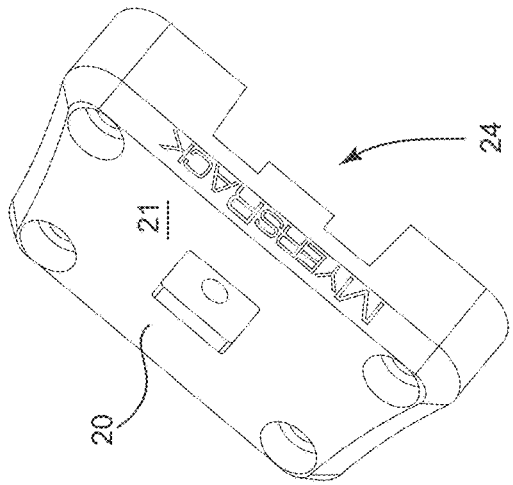
FIG. 10A
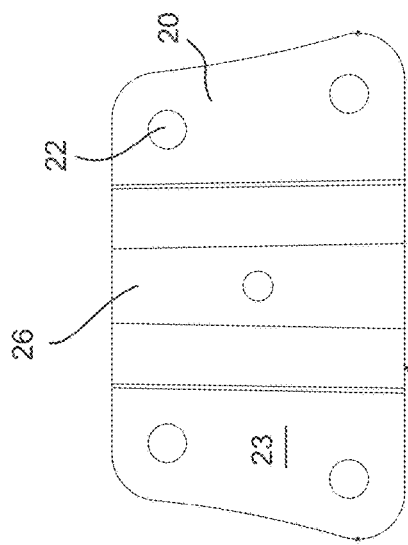
FIG. 10C
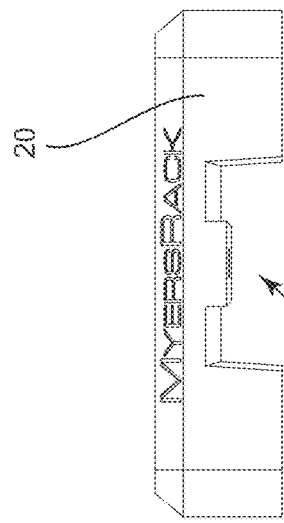
FIG. 10B
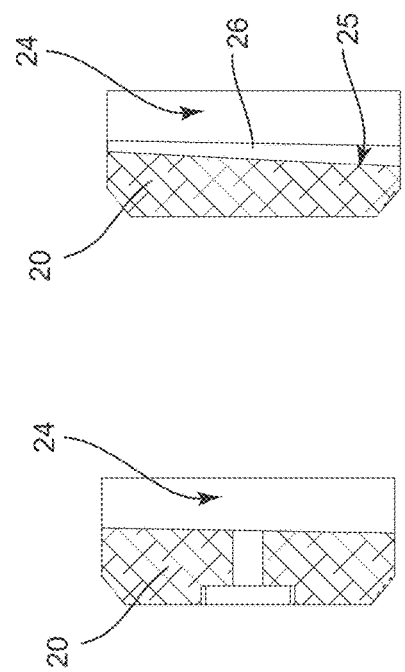
FIG. 10E
FIG. 10D

GRAB BAR MOUNT

CROSS REFERENCE TO RELATED APPLICATION[S]

This application is a continuation of the earlier U.S. Utility patent application Ser. No. 17/559,047, filed Dec. 22, 2021, the disclosure of which is hereby incorporated entirely herein by reference.

BACKGROUND OF THE INVENTION

Technical Field

This invention relates generally to a mount for an off road vehicle and more particularly to a grab bar mount for mounting devices to a grab bar of an off road vehicle.

State of the Art

The use of mobile computing devices and cameras on vehicles is ever growing. This is particularly true when it comes to off road vehicles, motorcycles and the like. Mounts exist that allow the devices to be attached to off road vehicles, however, these mounts are lacking in the ability to couple to a grab bar in a position that does not interfere with proper use of a grab bar.

Accordingly, there is a need for an improved grab bar mount for use in mounting an accessory device.

SUMMARY OF THE INVENTION

An embodiment includes a grab bar mount comprising: an upper member having a first channeled recess; and a lower member having a second channeled recess, wherein: the first channeled recess comprises a size and shape corresponding to a size and shape of an upper portion of a grab bar post of an off road vehicle; the second channeled recess comprises a size and shape corresponding to a size and shape of a lower portion of the grab bar post of the off road vehicle; and the upper member and the lower member are releasably coupled together around the grab bar post with the grab bar post extending through the first and second channeled recesses.

Another embodiment includes a method of using a grab bar mount comprising: providing a grab bar mount comprising: an upper member having a first channeled recess; and a lower member having a second channeled recess, wherein: the first channeled recess comprises a size and shape corresponding to a size and shape of an upper portion of a grab bar post of an off road vehicle; and the second channeled recess comprises a size and shape corresponding to a size and shape of a lower portion of the grab bar of the off road vehicle; releasably coupling the upper member to the lower member around the grab bar post with the grab bar post extending through the first and second channeled recesses; and inhibiting movement of the grab bar mount with respect to the grab bar post in response to coupling the upper member to the lower member around the grab bar post.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 10A is a perspective view of an upper member of a grab bar mount, according to an embodiment;

FIG. 10B is a front view of an upper member of a grab bar mount, according to an embodiment;

FIG. 10C is a bottom view of an upper member of a grab bar mount, according to an embodiment;

FIG. 10D is a first section view of an upper member of a grab bar mount, according to an embodiment;

FIG. 10E is a second section view of an upper member of a grab bar mount, according to an embodiment;

DETAILED DESCRIPTION OF EMBODIMENTS OF THE INVENTION

Figure 1:
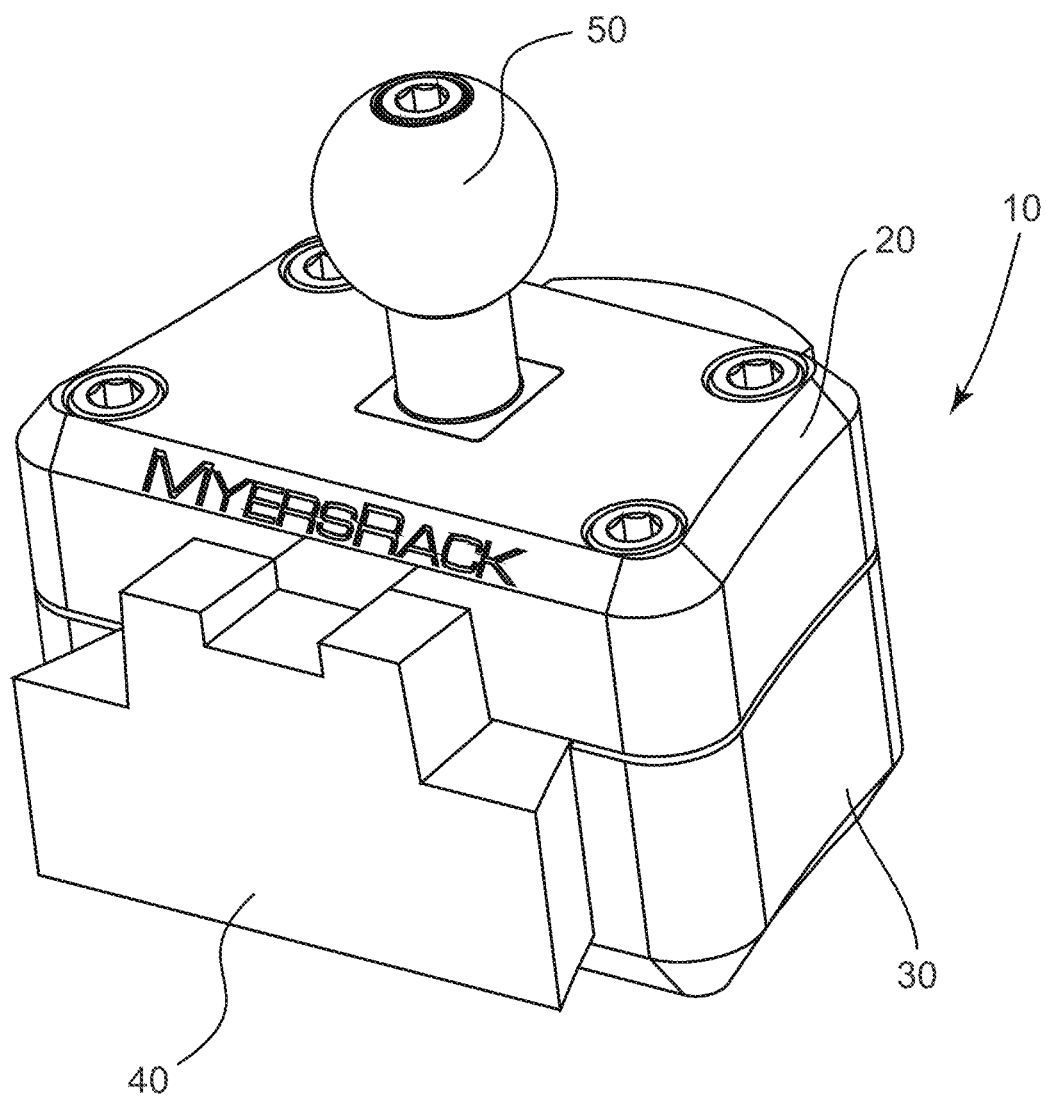
FIG. 1 is a perspective view of a grab bar mount, according to an embodiment.
Figure 2:
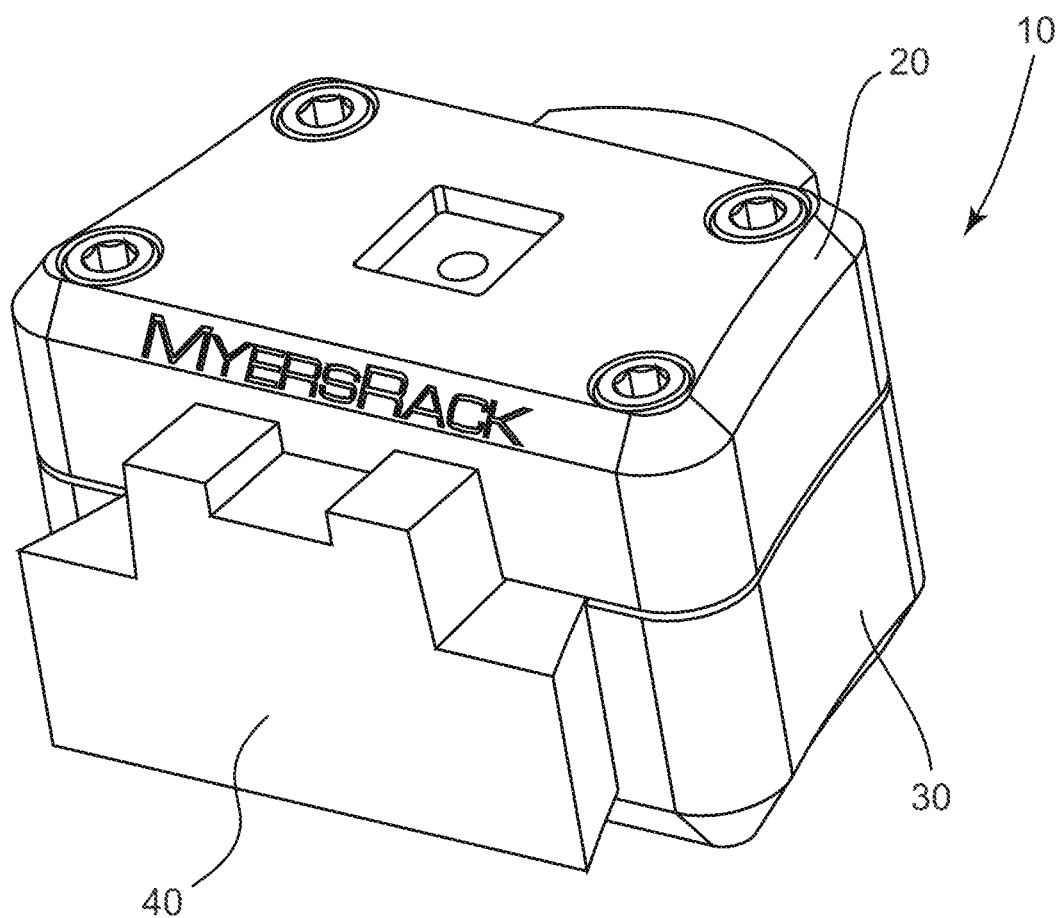
FIG. 2 is another perspective view of a grab bar mount, according to an embodiment.
Figure 3:
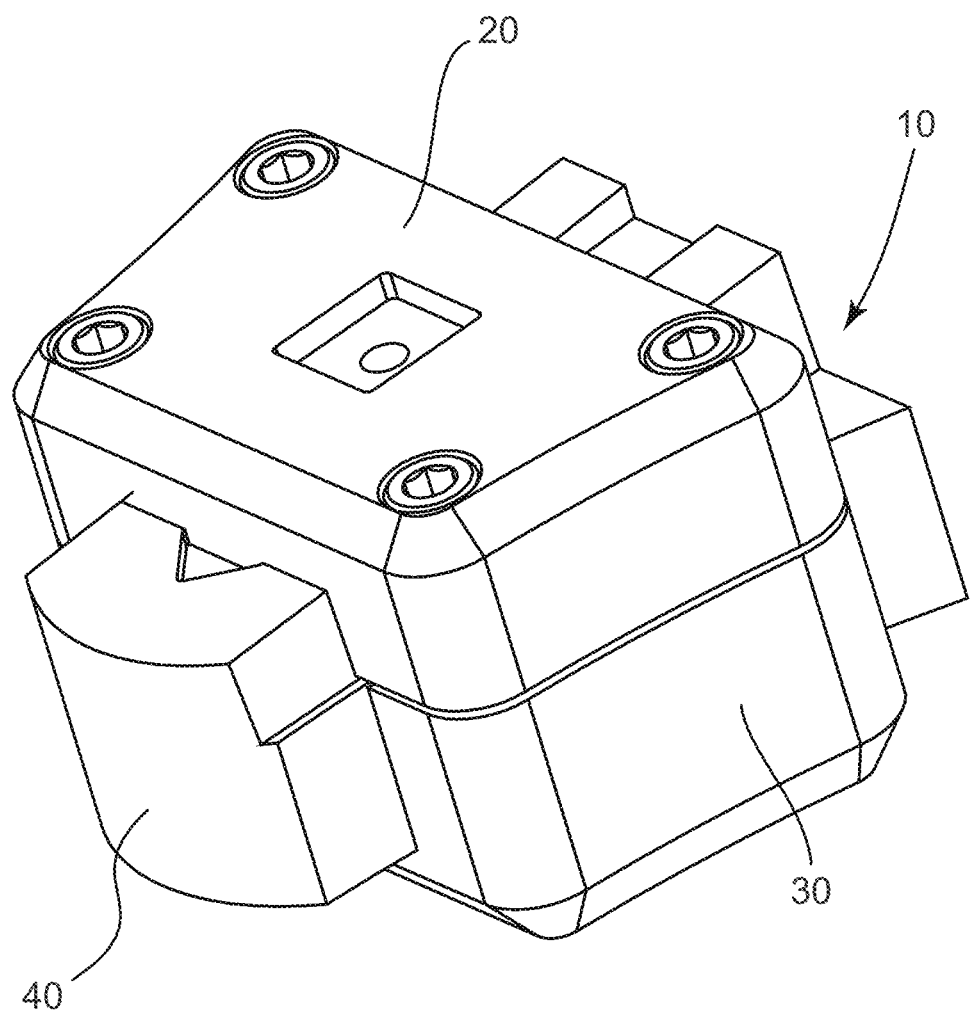
FIG. 3 is a third perspective view of a grab bar mount, according to an embodiment.
Figure 4:
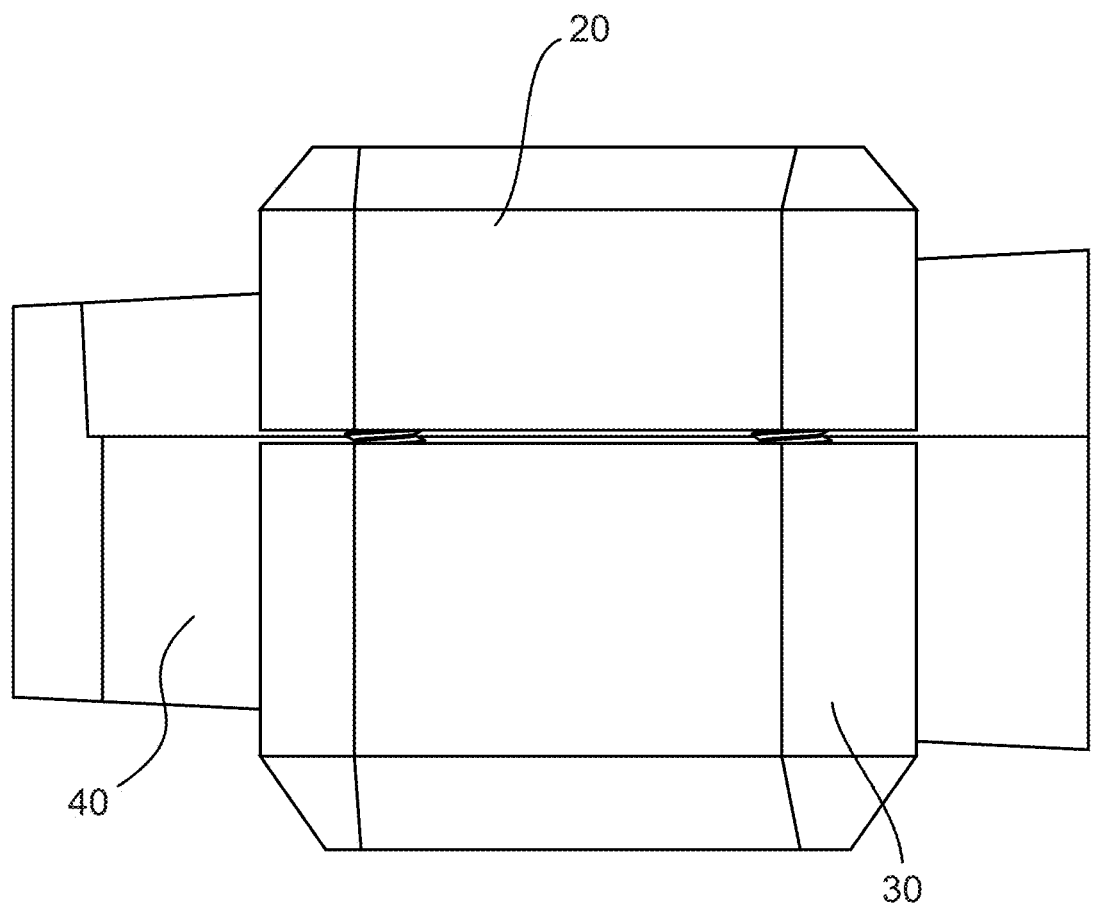
FIG. 4 is a side view of a grab bar mount, according to an embodiment.
Figure 5:
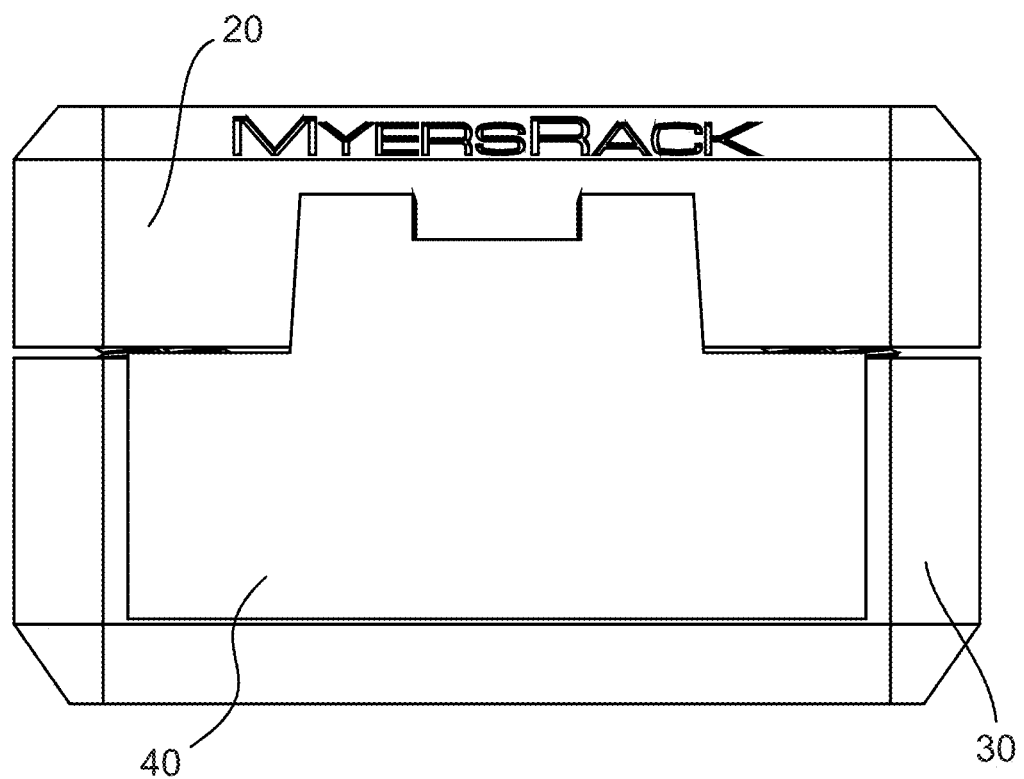
FIG. 5 is a front view of a grab bar mount, according to an embodiment.
Figure 6:
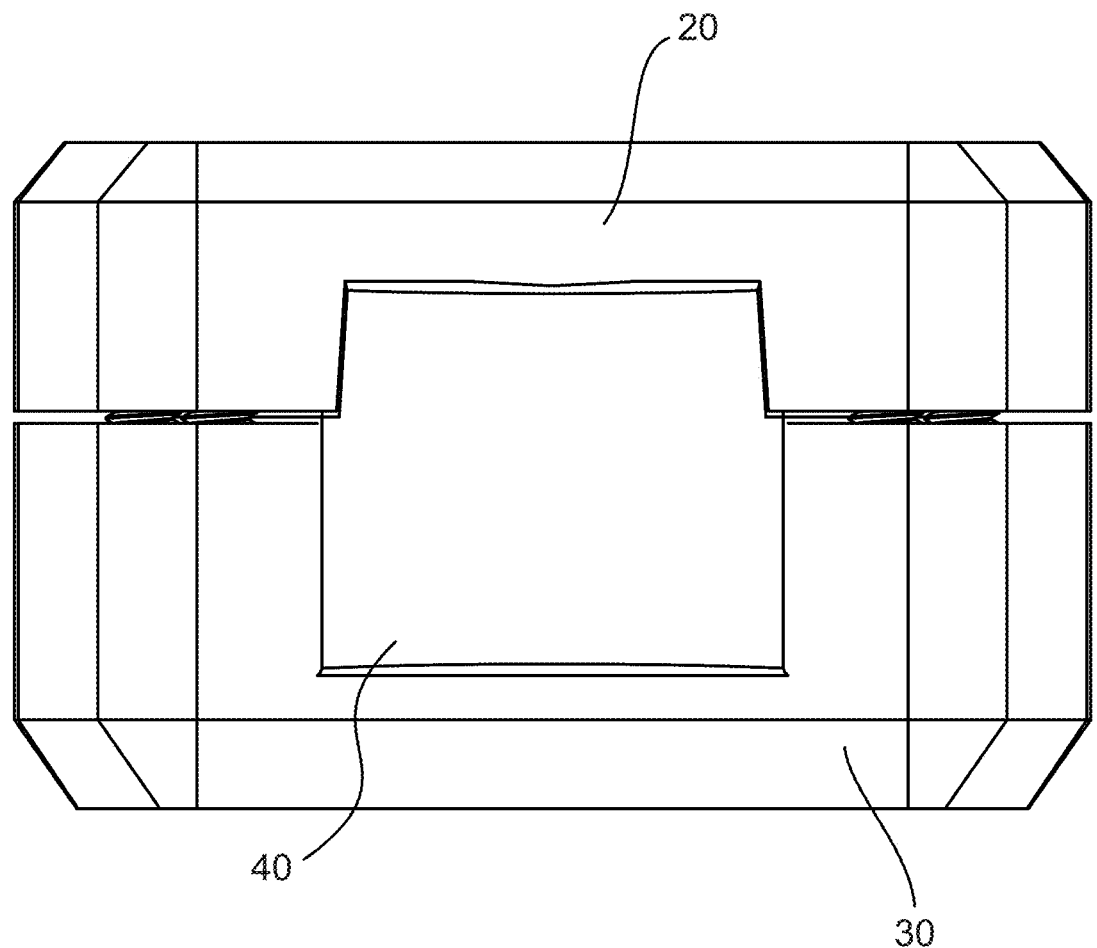
FIG. 6 is a rear view of a grab bar mount, according to an embodiment.

As discussed above, embodiments of the present invention relate to grab bar mount that is coupled around a grab bar post and resists movement of the grab bar mount with respect to the grab bar post.

Referring to FIGS. 1-11D, an embodiment of a grab bar mount 10 is depicted. Generally, a grab bar mount 10 comprises an upper member 20 and a lower member 30. The upper member 20 and the lower member 30 may be coupled around a grab bar post 40 as shown in FIGS. 1-9.

The upper member 20, as shown in FIGS. 10A-10E, includes an upper surface 21 and a lower surface 23. A first channeled recess 24 is formed in the lower surface 23. The first channeled recess 24 may include a size and shape corresponding to an outer surface of an upper portion 44 of the grab bar post 40. For example, as shown in the drawing figures, the first channeled recess 24 may include a protrusion 26 that splits the first channeled recess 24 to form two separated inner channels within the first channeled recess 24, the protrusion 26 has a bottom surface parallel to the bottom surface 23 of the upper member 20 but recessed from the bottom surface 23. The two separated channels may each have a tapered surface 25. The shape and size of the first channeled recess 24 correspond to the upper portion 44 of the grab bar post 40. In this embodiment an entire surface forming the first channeled recess 24 contacts and engages an outer surface of the upper portion 44 of the grab bar post 40 when the upper member 20 and the lower member 30 are coupled together around the grab bar post 40. Additionally, the upper surface 21 may include an accessory mounting aperture formed in the surface to allow an accessory, such as, but not limited to, ball mount 50 (see FIG. 1) to be coupled to the grab bar mount 10.

The lower member 30, as shown in FIGS. 11A-11D, includes an upper surface 31 and a lower surface 33. A second channeled recess 34 is formed in the upper surface 31. The second channeled recess 34 may include a size and shape corresponding to an outer surface of a lower portion 46 of the grab bar post 40. For example, as shown in the drawing figures, the second channeled recess 34 may include tapered side surfaces or side surface that are arcuate in shape and reduces in width as the channel extends from a front end to a rear end of the lower member 30. The shape and size of the second channeled recess 34 correspond to the lower portion 46 of the grab bar post 40. In this embodiment an entire surface forming the second channeled recess 34 contacts and engages an outer surface of the lower portion 46 of the grab bar post 40 when the upper member 20 and the lower member 30 are coupled together around the grab bar post 40.

Figure 7:
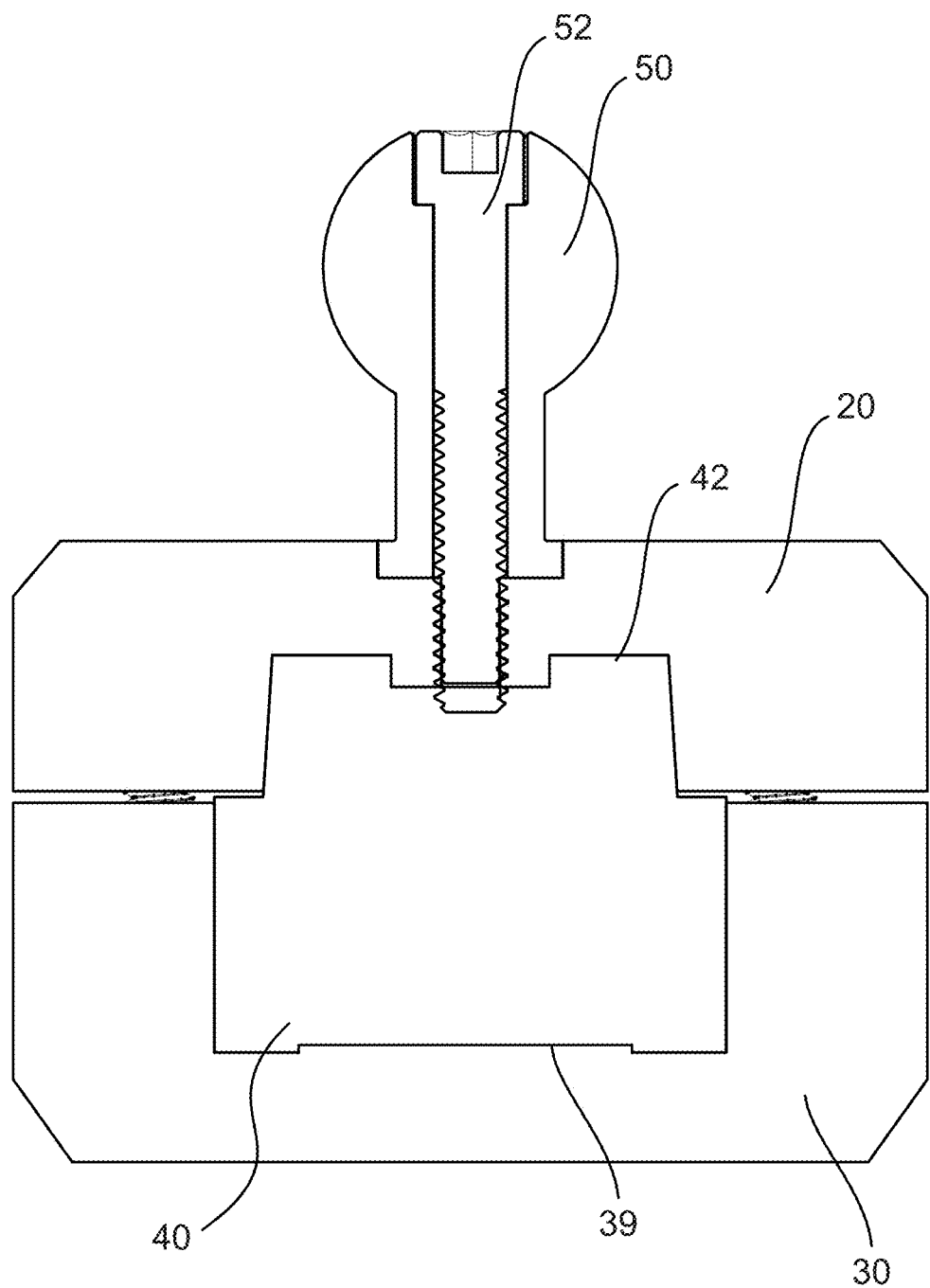
FIG. 7 is a section view of a grab bar mount, according to an embodiment.
Figure 8:
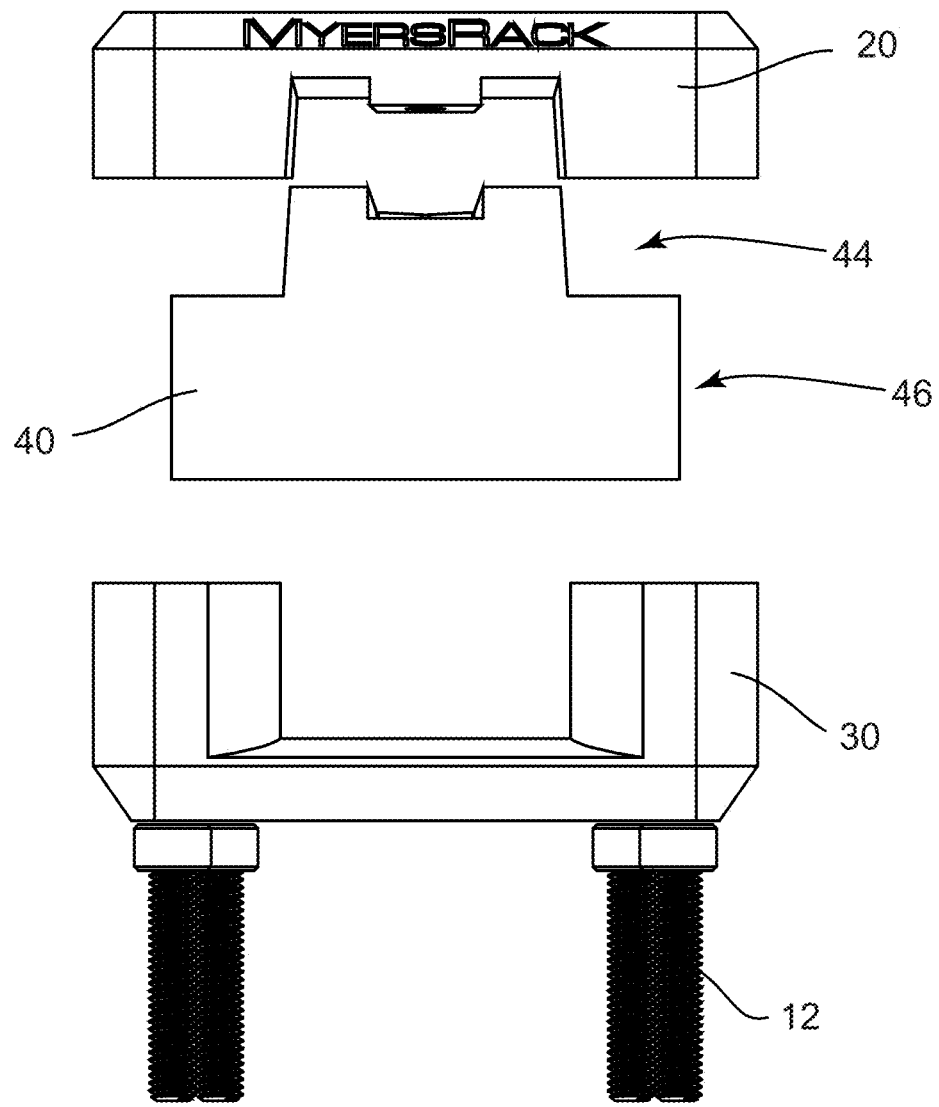
FIG. 8 is a front exploded view of a grab bar mount, according to an embodiment.
Figure 9:
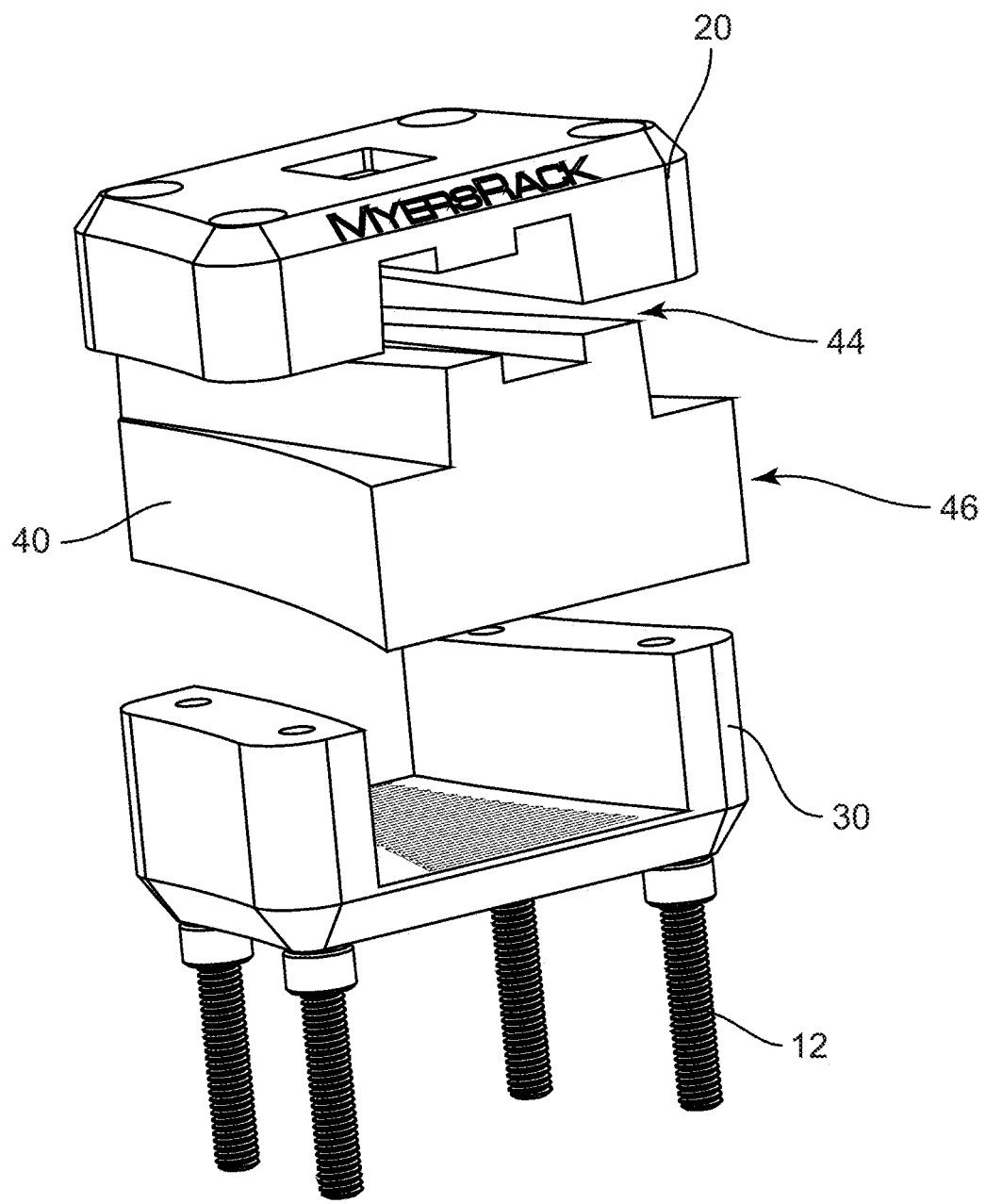
FIG. 9 is a perspective exploded view of a grab bar mount, according to an embodiment.
Figure 11A:
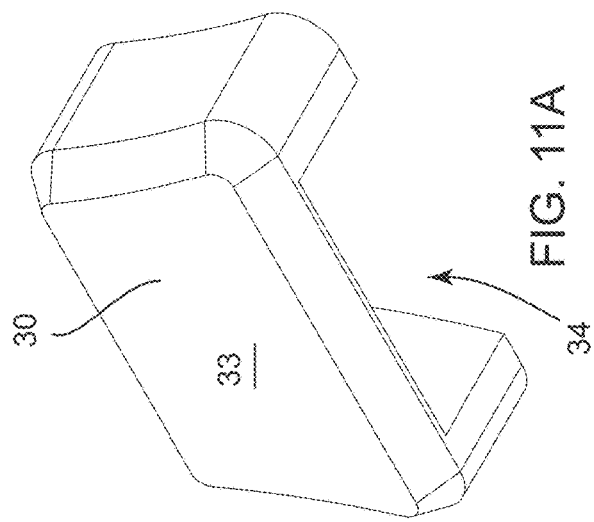
FIG. 11A is a perspective view of a lower member of a grab bar mount, according to an embodiment.
Figure 11C:
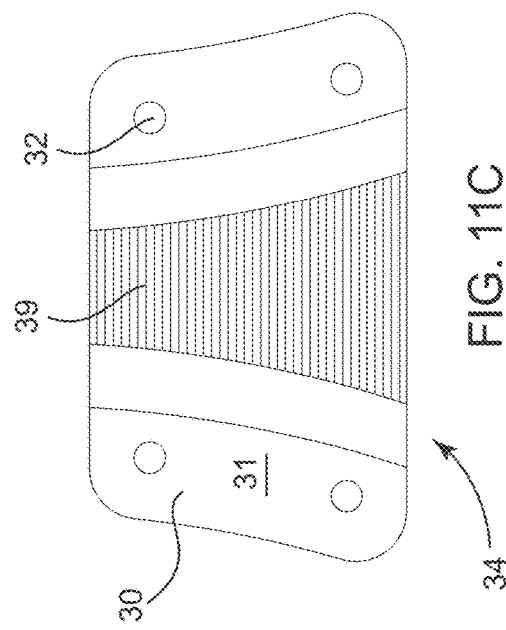
FIG. 11C is a top view of a lower member of a grab bar mount, according to an embodiment.
Figure 11B:
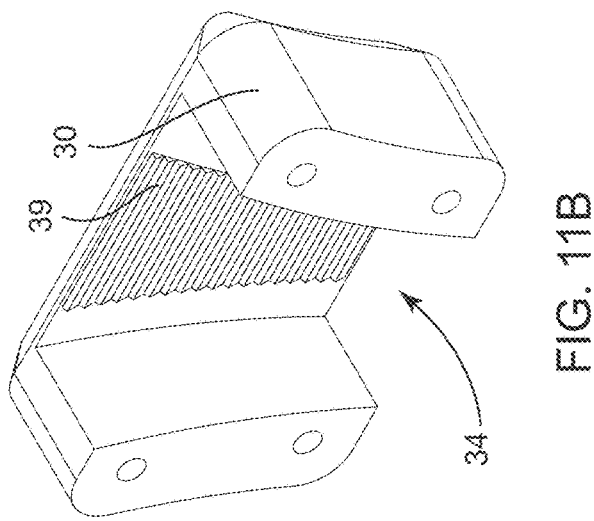
FIG. 11B is another perspective view of a lower member of a grab bar mount, according to an embodiment.
Figure 11D:
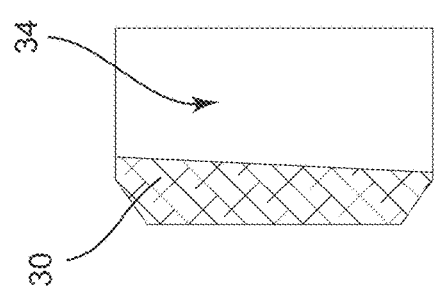
FIG. 11D is a section view of a lower member of a grab bar mount, according to an embodiment.

The upper member 20 may be releasably coupled to the lower member 30 by use of bolts 12 that extend through bolt apertures 22 of the upper member 20 and coupled to bolt apertures 32 of the lower member 30. The bolts operate to clamp the grab bar post 40 between the upper member 20 and lower member 30. The bolts 12 operate to increase friction between the first and second channeled recesses 24 and 34 and the grab bar post 40. This friction reduces movement of the grab bar mount 10 with respect to the grab bar post 40. Additionally, the upper member may include a size and shape to create an interference 42 between a back end of the upper member 20 and the upper surface of the grab bar post 40. Further, as shown in FIGS. 7, 9 and 11, the second channeled recess 34 in the lower member of the grab bar mount 10 may include a knurled portion 39 formed in a surface, wherein the knurled portion 39 engages the grab bar post and provides an additional means of preventing movement of the grab bar mount 10 with respect to the grab bar post 40. Further still, as shown in FIG. 7, a bolt 52 may operate to secure an accessory 50 to the upper member 20. In embodiments, the bolt 52 may also function as a set screw by engaging a top surface of the grab bar post 40, thereby further inhibiting movement of the grab bar mount 10 with respect to the grab bar post 40.

Another embodiment may include a method of using a grab bar mount. The method may comprise providing a grab bar mount as described above; releasably coupling the upper member to the lower member around the grab bar post with the grab bar post extending through the first and second channeled recesses; and inhibiting movement of the grab bar mount with respect to the grab bar post in response to coupling the upper member to the lower member around the grab bar post.

The method may further include engaging an entire surface forming the first channeled recess with an outer surface of the upper portion of the grab bar post when the upper member and the lower member are coupled together around the grab bar post; engaging an entire surface forming the second channeled recess with an outer surface of the lower portion of the grab bar post when the upper member and the lower member are coupled together around the grab bar post. The corresponding size and shape of the first channeled recess and the second channeled recess with the upper portion and the lower portion of the grab bar post respectively inhibit movement of the grab bar mount with respect to the grab bar post. The method may also comprise releasably coupling an accessory to the upper member.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A method of using a grab bar mount comprising:
providing a grab bar mount comprising:
an upper member having a first channeled recess and an accessory mounting aperture, wherein the mounting aperture is configured to releasably couple an accessory to the upper member;
a bolt that couples the accessory to the upper member by engaging the mounting aperture, wherein the bolt extends through the upper member and engages a grab bar post to inhibit movement of the grab bar mount with respect to the grab bar post; and
a lower member having a second channeled recess, wherein:
the first channeled recess comprises a size and shape corresponding to a size and shape of an upper portion of a grab bar post of an off road vehicle; and
the second channeled recess comprises a size and shape corresponding to a size and shape of a lower portion of the grab bar post of the off road vehicle;
releasably coupling the upper member to the lower member around the grab bar post with the grab bar post extending through the first and second channeled recesses; and
inhibiting movement of the grab bar mount with respect to the grab bar post in response to coupling the upper member to the lower member around the grab bar post.

2. The method of claim 1, further comprising engaging an entire surface forming the first channeled recess with an outer surface of the upper portion of the grab bar post when the upper member and the lower member are coupled together around the grab bar post.

3. The method of claim 2, further comprising engaging an entire surface forming the second channeled recess with an outer surface of the lower portion of the grab bar post when the upper member and the lower member are coupled together around the grab bar post.

4. The method of claim 3, wherein the corresponding size and shape of the first channeled recess and the second channeled recess with the upper portion and the lower portion of the grab bar post respectively inhibit movement of the grab bar mount with respect to the grab bar post.

5. The method of claim 4, further comprising releasably coupling an accessory to the upper member.

* * * * *